US012770384B2

(12) United States Patent
Kim et al.

(10) Patent No.: US 12,770,384 B2
(45) Date of Patent: Oct. 20, 2026

(54) METHOD AND APPARATUS FOR GENERATING FRAME DATA FOR NEURAL NETWORK LEARNING BASED ON SIMILARITY BETWEEN FRAMES

(71) Applicant: AGENCY FOR DEFENSE DEVELOPMENT, Daejeon (KR)

(72) Inventors: Daehwan Kim, Daejeon (KR); Eunjin Koh, Daejeon (KR); Wonhyuk Yang, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 332 days.

(21) Appl. No.: 18/414,465

(22) Filed: Jan. 17, 2024

(65) Prior Publication Data

US 2024/0242493 A1 Jul. 18, 2024

(30) Foreign Application Priority Data

Jan. 17, 2023 (KR) ........................ 10-2023-0006930

(51) Int. Cl.

*G06V 10/82* (2022.01)
*G06V 10/74* (2022.01)
*G06V 10/75* (2022.01)
*G06V 10/778* (2022.01)

(52) U.S. Cl.

CPC ............ *G06V 10/82* (2022.01); *G06V 10/758* (2022.01); *G06V 10/761* (2022.01); *G06V 10/7788* (2022.01)

(58) Field of Classification Search

None
See application file for complete search history.

(56) References Cited

U.S. PATENT DOCUMENTS

| | | | | |
|---|---|---|---|---|
| 2019/0035047 A1* | 1/2019 | Lim | ........................ | H04N 23/67 |
| 2019/0114505 A1 | 4/2019 | Albayrak et al. | | |
| 2022/0375033 A1 | 11/2022 | Suzuki et al. | | |

FOREIGN PATENT DOCUMENTS

| | | | |
|---|---|---|---|
| JP | 3358692 | 12/2002 | |
| KR | 20180131621 | 12/2018 | |
| KR | 1020190103840 | 9/2019 | |
| KR | 102144975 | 8/2020 | |
| KR | 102144975 B1 * | 8/2020 | ............. G06N 20/00 |

OTHER PUBLICATIONS

Translation_KR_102144975 (Year: 2020).*
"Request for the Submission of an Opinion of Korea Counterpart Application", issued on Mar. 21, 2023, with English translation thereof, pp. 1-10.
"Written Decision on Registration of Korea Counterpart Application", issued on Jul. 25, 2023, pp. 1-11.

* cited by examiner

*Primary Examiner* — Dov Popovici
(74) *Attorney, Agent, or Firm* — Ladas & Parry, LLP

(57) ABSTRACT

Provided is technology for generating training data and generating a neural network model based on a frame similarity. A method of generating a neural network model by using a video includes determining an image similarity between consecutive frames from among a plurality of frames included in the image, generating training frame data by excluding at least one of the consecutive frames, when the image similarity is equal to or greater than a threshold value, and generating the neural network model based on the training frame data.

8 Claims, 6 Drawing Sheets

METHOD AND APPARATUS FOR GENERATING FRAME DATA FOR NEURAL NETWORK LEARNING BASED ON SIMILARITY BETWEEN FRAMES

CROSS-REFERENCE TO RELATED APPLICATION

This application is based on and claims priority under 35 U.S.C. § 119 to Korean Patent Application No. 10-2023-0006930, filed on Jan. 17, 2023, in the Korean Intellectual Property Office, the disclosure of which is incorporated by reference herein in its entirety.

BACKGROUND

1. Field

The disclosure relates to technology for generating training data and generating a neural network model based on a frame similarity.

2. Description of the Related Art

Deep learning is a method of machine learning, which independently trains general rules as an artificial neural network from example data during a learning process.

Today, in order to generate a neural network model, there are an increasing number of cases where a data set is constructed by capturing a video including a plurality of frames, rather than collecting data by capturing images one by one, in terms of the diversity of sensors, the cost of photographing for each sensor, and systematic factors.

In the case of a video, a vast amount of data may be collected faster and more easily than a single image, but in a data processing step, problems with data redundancy may occur due to a high similarity between consecutive frames due to the characteristics of time-series data. Accordingly, technology for effectively preprocessing video data is required.

The background described above is technology information that the inventor possessed for the derivation of the disclosure or acquired in the derivation process of the disclosure, and it may not be said that it is known technology disclosed to the general public before the filing of the disclosure.

SUMMARY

Provided are a method and apparatus for generating training data based on a frame similarity.

Additional aspects will be set forth in part in the description which follows and, in part, will be apparent from the description, or may be learned by practice of the presented embodiments.

According to an aspect of the disclosure, a method of generating a neural network model by using a video includes determining an image similarity between consecutive frames from among a plurality of frames included in the image, generating training frame data by excluding at least one of the consecutive frames, when the image similarity is equal to or greater than a threshold value, and generating the neural network model based on the training frame data.

The generating of the training frame data may include setting the threshold value in response to a user command.

The determining of the image similarity may include dividing each of the plurality of frames into a plurality of blocks, calculating a histogram similarity between corresponding blocks between the consecutive frames from among the plurality of blocks, and determining the image similarity based on the histogram similarity.

The calculating of the histogram similarity may include calculating the histogram similarity by using at least one of a correlation, a chi squared test, an intersection, a Bhattacharyya distance, and an earth mover's distance (EMD) between the corresponding blocks between the consecutive frames.

The determining of the image similarity based on the histogram similarity may include detecting an edge value of each of the plurality of blocks, determining a weight value according to the edge value, and determining the image similarity between the consecutive frames by calculating a weighted arithmetic average by using the weight value and the histogram similarity.

According to another aspect of the disclosure, a computer device includes a memory in which a video, a neural network model, and training frame data are stored, and a processor configured to determine an image similarity between consecutive frames from among a plurality of frames included in the video, generate the training frame data by excluding at least one of the consecutive frames when the image similarity is equal to or greater than a threshold value, and generate the neural network model based on the training frame data.

The processor may be further configured to set the threshold value in response to a user command.

The processor may be further configured to divide each of the plurality of frames into a plurality of blocks, calculate a histogram similarity between corresponding blocks between the consecutive frames from among the plurality of blocks, and determine the image similarity based on the histogram similarity.

The processor may be further configured to calculate the histogram similarity by using at least one of a correlation, a chi squared test, an intersection, a Bhattacharyya distance, and an earth mover's distance (EMD) between the corresponding blocks between the consecutive frames.

The processor may be further configured to detect an edge value of each of the plurality of blocks, determine a weight value according to the edge value, and determine the image similarity between the consecutive frames by calculating a weighted arithmetic average by using the weight value and the histogram similarity.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Figure 1:
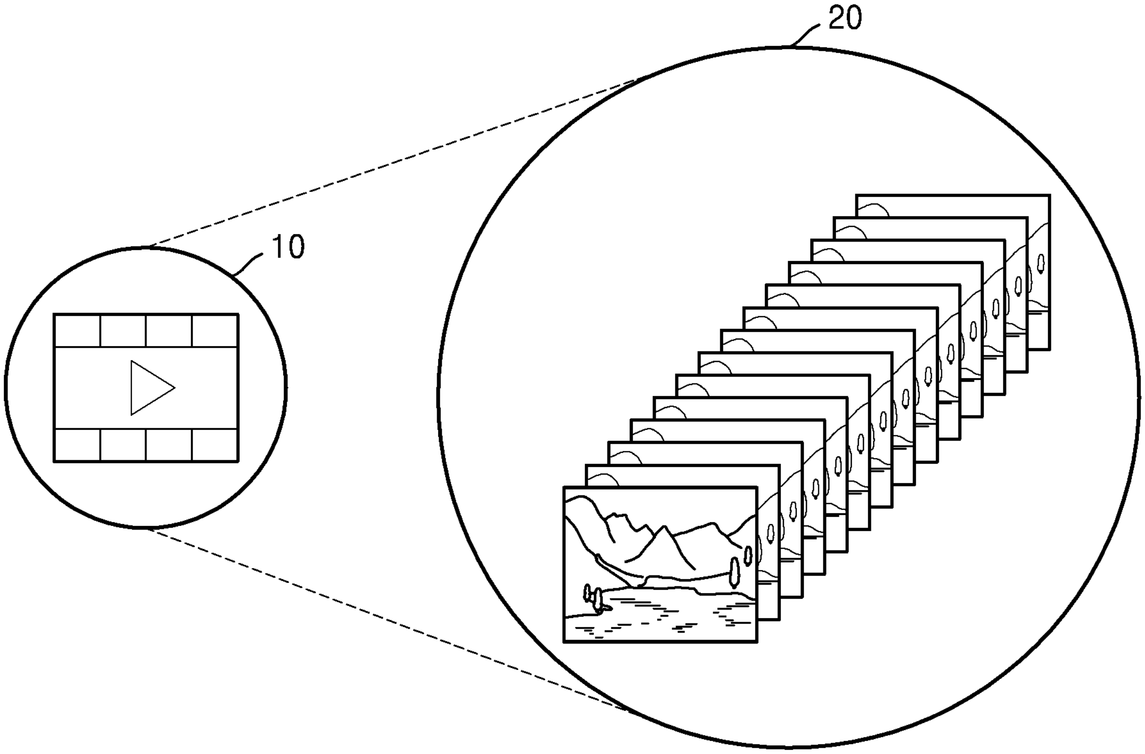
FIG. 1 is a view for describing an operation of performing neural network learning by using video data.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As the disclosure allows for various changes and numerous embodiments, certain embodiments will be illustrated in the drawings and described in the detailed description. Effects and features of the disclosure, and methods for achieving them will be clarified with reference to embodiments described below in detail with reference to the drawings. However, the disclosure is not limited to the following embodiments and may be embodied in various forms.

Each logic block may represent a module, segment, or portion of code, which includes one or more executable instructions for performing a specific logical function. It should be noted that in another embodiment, functions mentioned for blocks may be performed differently from the described order. For example, even when two blocks are shown in succession, functions mentioned for the blocks may be performed substantially simultaneously or may be performed in reverse order as execution conditions or environments change. As used herein, the singular forms "a," "an," and "the" are intended to include the plural forms as well, unless the context clearly indicates otherwise.

It will be understood that the terms "including," and "having," are intended to indicate the existence of the features or elements described in the specification, and are not intended to preclude the possibility that one or more other features or elements may exist or may be added.

Instructions executed through a processor of a computer or other programmable data processing equipment may generate means for performing each function described with reference to a flowchart or a block diagram. Instructions may be loaded into a computer or the like and may generate processes executed on the computer or the like to perform a series of operational steps.

The term "... unit" used in the present embodiment refers to an element that performs a specific function performed by software or hardware such as a field-programmable gate array (FPGA) or an application-specific integrated circuit (ASIC). However, the term "... unit" is not limited to being performed by software or hardware. A " . . . unit" may be present as data stored in an addressable storage medium or may be configured so that one or more processors execute a specific function.

Sizes of components in the drawings may be exaggerated or reduced for convenience of explanation. For example, because sizes and thicknesses of elements in the drawings are arbitrarily illustrated for convenience of explanation, the disclosure is not limited thereto. Also, in the disclosure, the expression such as "greater than" or "less than" is used to determine whether a particular condition is satisfied or fulfilled, but this is only an example and the expression may not exclude the description of "equal to or greater than" or "equal to or less than". A condition written with "equal to or greater than" may be replaced with "greater than", a condition with "equal to or less than" may be replaced with "less than", and a condition with "equal to or greater than . . . and less than . . . " may be replaced with "greater than . . . and equal to or less than . . . ".

Software may include a computer program, code, instructions, or a combination thereof, and may independently or collectively instruct or configure a processing device to operate as desired. Software and/or data may be embodied permanently or temporarily in any type of machine, component, physical or virtual equipment, computer storage medium or device, or a transmitted signal wave, to provide instructions or data to or to be interpreted by a processing device. Software may also be distributed over network coupled computer systems so that the software is stored and executed in a distributed fashion. Software and data may be stored in one or more computer-readable recording media.

A neural network model according to the disclosure is a representative example of an artificial neural network model that simulates brain nerves, and is not limited to a specific algorithm.

FIG. 1 is a view for describing an operation of performing neural network learning by using video data.

Referring to FIG. 1, a video 10 may include a plurality of frames 20. Data using the video 10 may be used to train and generate a neural network model in a manner similar to an image by preprocessing each of the plurality of frames 20 through image processing.

In general, unlike a data set using a plurality of images, because the video 10 uses temporally consecutive frames, a similarity of a data set is relatively high. Accordingly, data redundancy between frames may occur. This data redundancy may cause data imbalance between classes even when the size of the data set is the same, thereby reducing the efficiency and accuracy of deep learning or causing overfitting. Also, when the data set includes all of the plurality of frames 20 included in the video 10, the size of the data may increase, which may be inefficient in terms of model training time.

Figure 2:
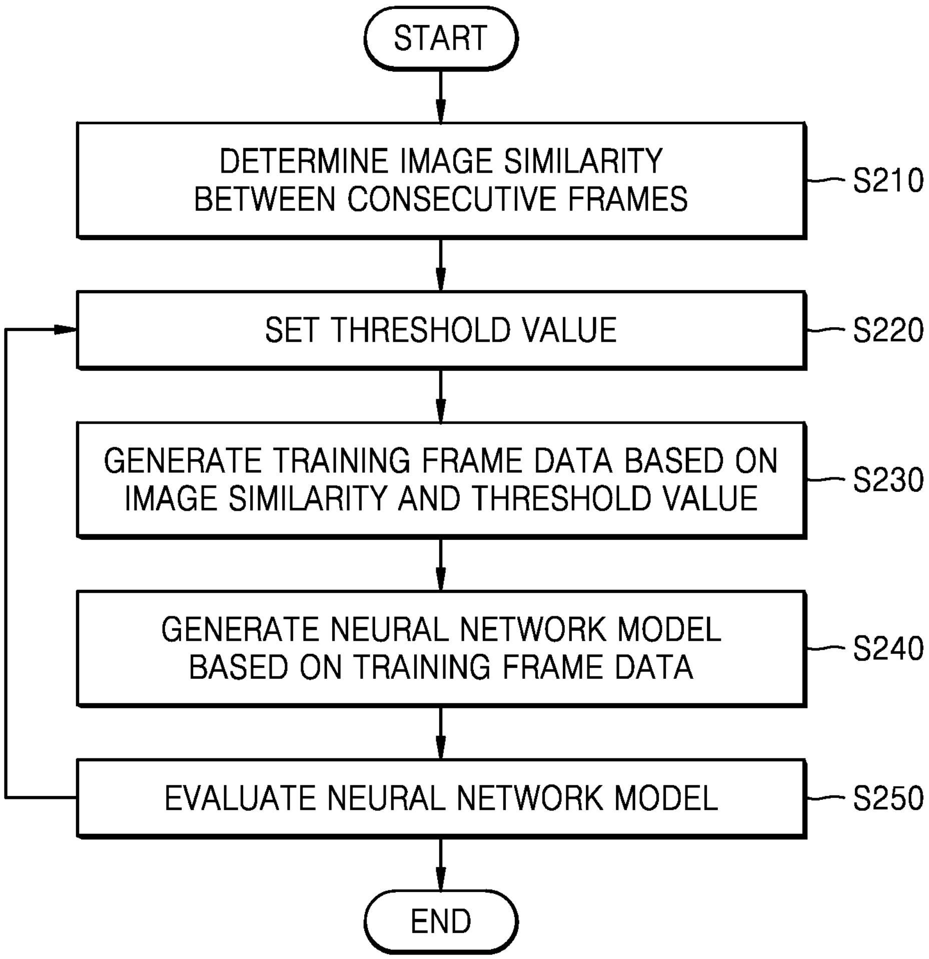
FIG. 2 is a flowchart illustrating an operation in which a computer device generates a neural network model, according to an embodiment.

FIG. 2 is a flowchart illustrating an operation in which a computer device generates a neural network model, according to an embodiment.

Referring to FIG. 2, in operation S210, a computer device may determine an image similarity between temporally consecutive frames from among a plurality of frames included in a video. In detail, the computer device may determine a similarity between consecutive frames by dividing each of the plurality of frames into a plurality of blocks and calculating a histogram similarity between the blocks. This operation of the computer device will be described below in detail with reference to FIG. 3.

In operation S220, the computing device according to an embodiment may set a threshold value. The threshold value is a preset value or a value set in response to a user command, and may be used to determine a size of training frame data for generating a neural network.

In operation S230, the computer device according to an embodiment may generate training frame data based on the image similarity and the threshold value. The computer device may exclude at least one frame from among the consecutive frames when the image similarity between the consecutive frames is equal to or greater than the threshold value, and may generate training frame data including the consecutive frames when the image similarity between the consecutive frames is less than the threshold value.

For example, when an image similarity between an (N−1)$^{th}$ frame and an N$^{th}$ frame is equal to or greater than a threshold value, the computer device may exclude one of the N−1$^{th}$ frame and the N$^{th}$ frame. Also, the computer device may exclude one of two consecutive frames or may exclude at least one of k consecutive frames.

In operation S240, the computer device according to an embodiment may generate a neural network model based on the training frame data. For example, the computer device may perform neural network learning such as image recognition by using the training frame data.

In operation S250, the computer device according to an embodiment may evaluate the generated neural network model. The computer device may evaluate the performance of the neural network model and display the performance to a user, the user may check the displayed performance, and the computer device may return to operation S220 in which a threshold value is set again. The user may determine a size of the training frame data through a method of setting the threshold value, and the computer device may generate the neural network model by using a data set in which data redundancy is corrected. In detail, the user sets the threshold value for the image similarity stepwise from a high value to a low level and applies a threshold value that satisfies a size of a data set required for neural network learning. Alternatively, the user applies an adaptive threshold value according to the size of the data set required for neural network learning to store a desired number of training data by considering a size of redundant data and a total data size.

Figure 3:
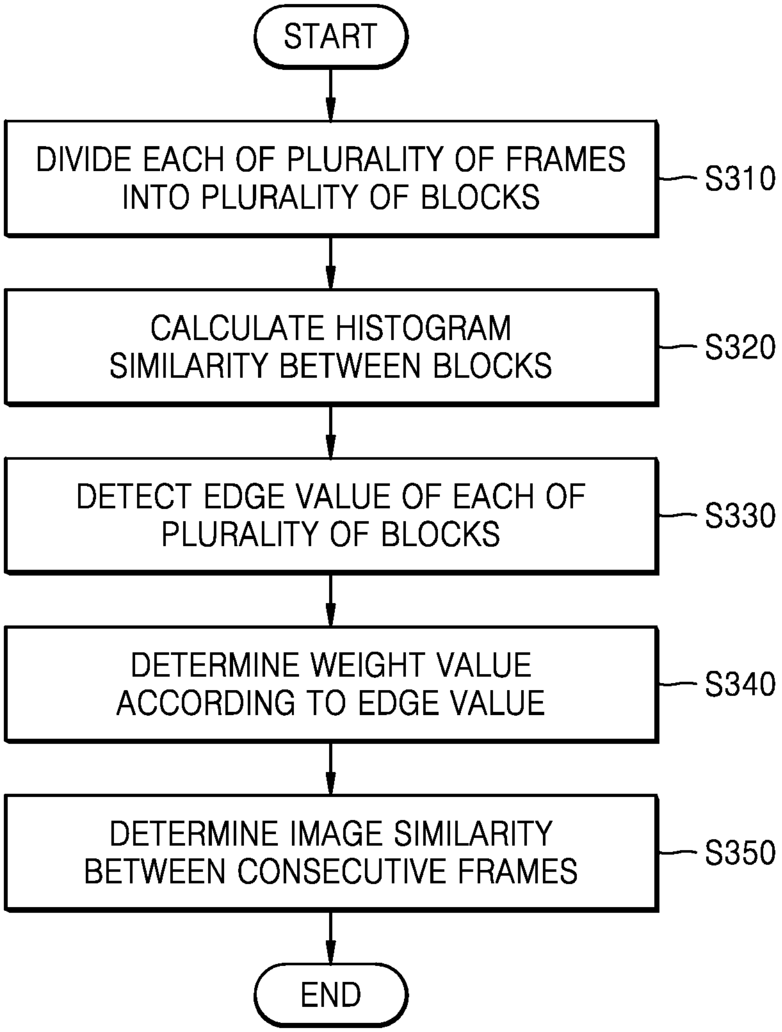
FIG. 3 is a flowchart illustrating an operation in which a computer device determines a similarity, according to an embodiment.

FIG. 3 is a flowchart illustrating an operation in which a computer device determines an image similarity, according to an embodiment. The operation of the computer device of FIG. 3 may correspond to operation S210 of FIG. 2.

Referring to FIG. 3, in operation S310, a computer device may divide each of a plurality of frames included in a video into a plurality of blocks. For example, one frame may be divided into n×m image blocks including a plurality of pixels based on a frame size. The computer device may divide one frame into a plurality of blocks and may divide all of the plurality of frames included in the video into a plurality of blocks.

In operation S320, the computer device according to an embodiment may calculate a histogram similarity between corresponding blocks between consecutive frames from among the plurality of blocks. For example, the computer device may perform histogram transformation on an a$^{th}$ block in an (N−1)$^{th}$ frame and may perform histogram transformation on an a$^{th}$ block in an N$^{th}$ frame to calculate a histogram similarity between the two blocks. When the computer device performs histogram transformation on a block, the computer device may perform the histogram transformation by including at least one of a pixel value and a feature value calculated by using the pixel value in the block.

Such a histogram similarity may be calculated by using at least one of a correlation, a chi squared test, an intersection, a Bhattacharyya distance, and an earth mover's distance (EMD) between corresponding blocks.

In operation S330, the computer device according to an embodiment may detect an edge value of each of the plurality of blocks. An edge refers to a portion of an image where the brightness of a pixel rapidly changes, and an edge value may be expressed as a ratio of the pixel whose brightness in the image rapidly changes.

In operation S340, the computer device according to an embodiment may determine a weight value according to the edge value. For example, the computer device may increase a weight value as the edge value increases.

In operation S350, the computer device according to an embodiment may determine the image similarity based on the histogram similarity. For example, the computer device may determine an overall average of the histogram similarity between the corresponding blocks between the consecutive frames as the image similarity.

In operation S350, the computer device according to another embodiment may determine the similarity between the consecutive frames by calculating a weighted arithmetic average by using the weight value and the histogram similarity. For example, the computer device may determine an overall average of the histogram similarity between the corresponding blocks between the consecutive frames as the image similarity.

For example, the image similarity may be calculated by using Equation 1.

$$\bar{X} = \frac{n_1\bar{x}_1 + n_2\bar{x}_2 + \ldots + n_k\bar{x}_k}{n_1 + n_2 + \ldots + n_k} = \frac{\sum n_i\bar{x}_i}{\sum n_i} \quad \text{[Equation 1]}$$

$\bar{X}$ denotes an image similarity, $\bar{x}_i$ denotes a histogram similarity for an i$^{th}$ block, and $n_i$ denotes a weight value according to an edge value of the i$^{th}$ block.

Figure 4:
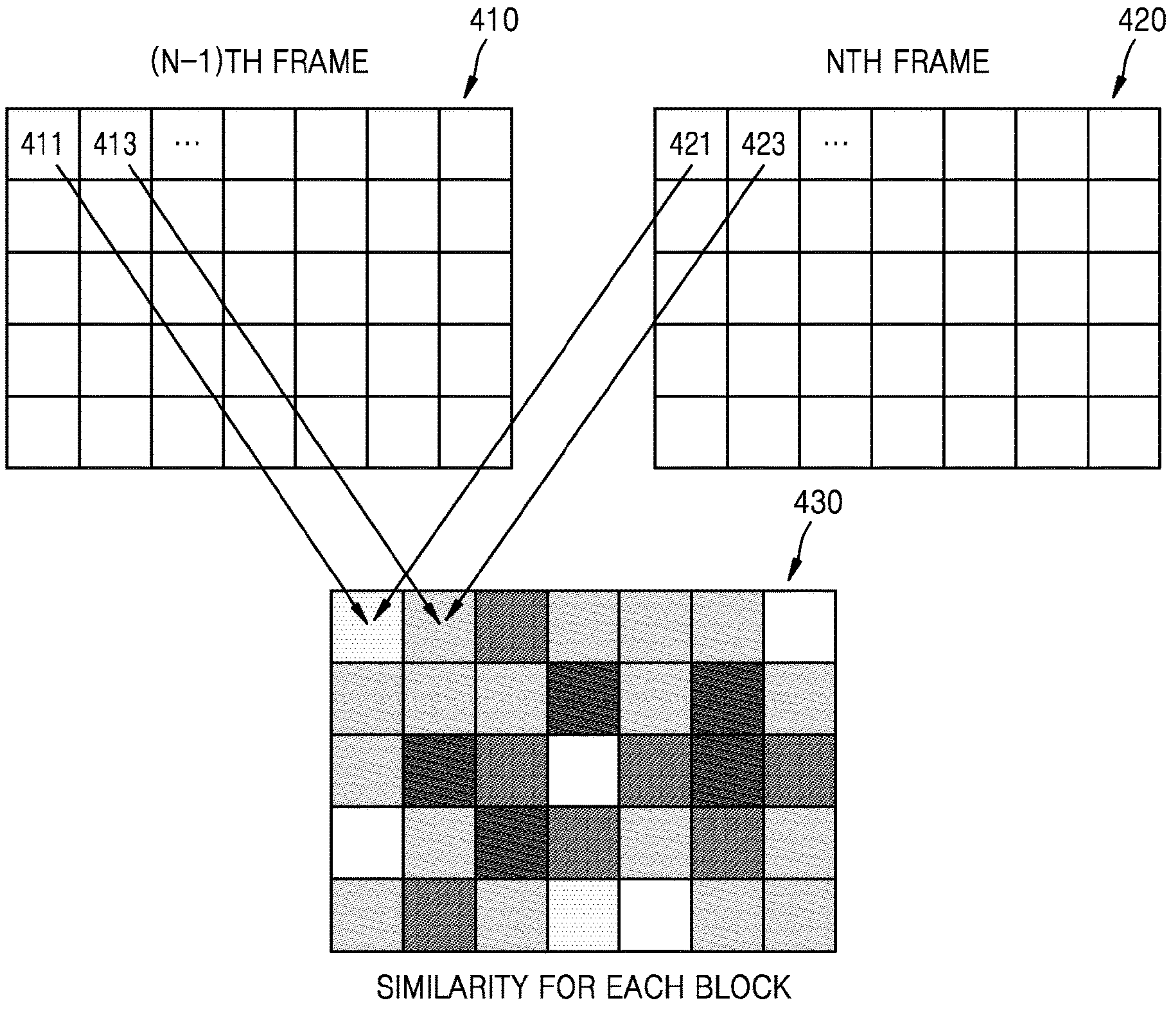
FIG. 4 is a view for describing an operation of calculating an image similarity between consecutive frames, according to an embodiment.

FIG. 4 is a view for describing an operation of calculating an image similarity between consecutive frames, according to an embodiment.

Referring to FIG. 4, a process of calculating a similarity between an (N−1)$^{th}$ frame 410 and an N$^{th}$ frame 420 is illustrated. Each of the (N−1)$^{th}$ frame 410 and the N$^{th}$ frame 420 may be divided into a plurality of blocks. For example, the (N−1)$^{th}$ frame 410 may be divided into a first block 411, a second block 413, etc. and the N$^{th}$ frame 420 may be divided into a first block 421, a second block 423, etc.

A computer device may calculate a histogram similarity in units of blocks, and the histogram similarity may be conceptually represented as a similarity 430 for each block. The computer device may determine an image similarity between the (N−1)$^{th}$ frame 410 and the N$^{th}$ frame 420 which are consecutive to each other by using an average of the similarity 430 for each block.

Figure 5:
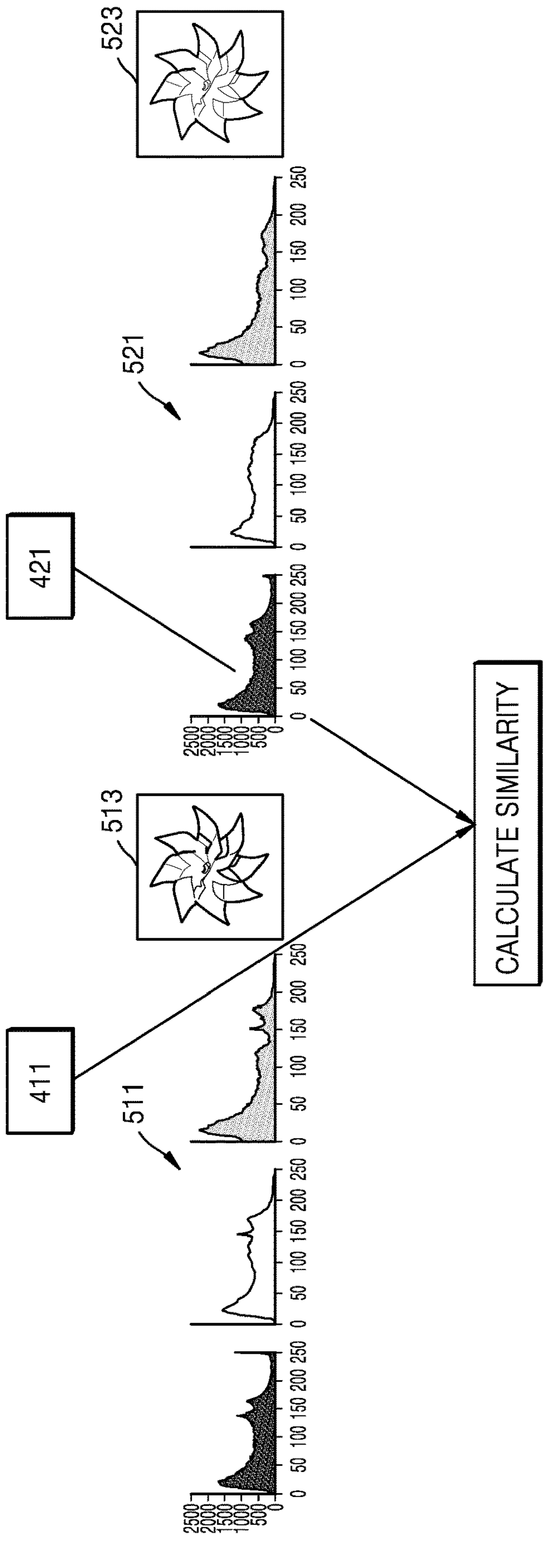
FIG. 5 is a view for describing an operation of detecting a histogram similarity between blocks and an edge value, according to an embodiment.

FIG. 5 is a view for describing an operation of detecting a histogram similarity between blocks and an edge value, according to an embodiment.

Referring to FIG. 5, a process of detecting a similarity between corresponding blocks between consecutive frames and an edge is illustrated. For example, the first block 410 in the (N−1)$^{th}$ frame 410 may correspond to the first block 421 in the N$^{th}$ frame 420.

A computer device may perform histogram transformation and edge detection on the first block 411 in the (N−1)$^{th}$ frame and the first block 421 in the N$^{th}$ frame.

The computer device may generate a first histogram 511 by performing histogram transformation on the first block 411 in the (N−1)$^{th}$ frame and may generate a first edge 513 by performing edge detection.

Also, the computer device may generate a second histogram 521 by performing histogram transformation on the first block 421 in the N$^{th}$ frame and may generate a second edge 523 by performing edge detection.

The computer device may calculate a histogram similarity between the first histogram 511 and the second histogram 521. For example, the computer device may calculate a histogram similarity between the first histogram 511 and the second histogram 521 by using at least one of a correlation, a chi squared test, an intersection, a Bhattacharyya distance, and an earth mover's distance (EMD).

The computer device may detect an edge value by using at least one of the first edge 513 and the second edge 523. For example, the computer device may determine an edge value by using only one of the first edge 513 and the second edge 523 or may determine an edge value by using an average value of the first edge 513 and the second edge 523.

Through the above process, the computer device may determine a histogram for each block and an edge value for each block between consecutive frames. The computer device may determine a weight value according to the edge value, and may determine an image similarity between the consecutive frames by calculating a weighted arithmetic average.

The computer device may exclude at least one of the consecutive frames when the image similarity between the consecutive frames is equal to or greater than a threshold value and may generate training frame data including the consecutive frames when the image similarity between the consecutive frames is less than the threshold value.

Figure 6:
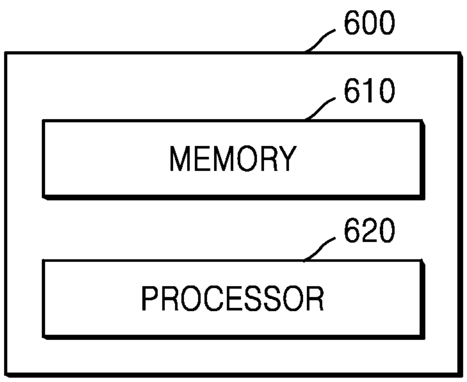
FIG. 6 is a block diagram illustrating a configuration of a computer device, according to an embodiment.

FIG. 6 is a block diagram illustrating a configuration of a computer device, according to an embodiment.

Although a computer device 600 includes a memory 610 and a processor 620, the disclosure is not necessarily limited thereto. Each of the memory 610 and the processor 620 may exist as one physically independent component.

The memory 610 may store various data for an overall operation of the computer device 600, such as a program for processing or control of the processor 620 in the computer device.

The memory 610 may store a plurality of application programs to be driven, data for an operation of the computer device 600, and instructions. The memory 610 may be implemented as an internal memory such as a read-only memory (ROM) or a random-access memory (RAM) included in the processor 620, or may be implemented as a memory separate from the processor 620.

The memory 610 according to an embodiment may store a video, a neural network model, and training frame data.

The processor 620 may be a component for generally controlling the computer device 600. For example, the processor 620 may control the computer device to perform operations in FIGS. 2 and 3.

In detail, the processor 620 may control an operation of the computer device 600 by using various programs stored in the memory 610 of the computer device 600. The processor 620 may include a central processing unit (CPU), a RAM, a ROM, and a system bus. The processor 620 may be implemented as a single CPU or multiple CPUs (or DSP and SoC). In an embodiment, the processor 620 may be implemented as a digital signal processor (DSP) for processing a digital signal, a microprocessor, or a time controller (TCON). However, the disclosure is not limited thereto, and the processor 620 may include or be defined as at least one of a central processing unit (CPU), a micro-controller unit (MCU), a micro-processing unit (MPU), a controller, an application processor (AP), a communication processor (CP), and an ARM processor. Also, the processor 620 may be implemented as a system-on-chip (SoC) with a processing algorithm therein, a large-scale integration (LSI), or a field-programmable gate array (FPGA).

The processor 620 according to an embodiment may determine an image similarity between consecutive frames from among a plurality of frames included in a video, may generate training frame data by excluding at least one frame from among the consecutive frames when the image similarity is equal to or greater than a threshold value, and may generate a neural network model based on the training frame data.

The processor 620 according to an embodiment may set the threshold value in response to a user command.

The processor 620 according to an embodiment may divide each of the plurality of frames into a plurality of blocks, may calculate a histogram similarity between corresponding blocks between consecutive frames from among the plurality of blocks, and may determine an image similarity based on the histogram similarity.

The processor 620 according to an embodiment may calculate the histogram similarity by using at least one of a correlation, a chi squared test, an intersection, a Bhattacharyya distance, and an earth mover's distance (EMD) between the corresponding blocks between the consecutive frames.

The processor 620 according to an embodiment may detect an edge value of each of the plurality of blocks, may determine a weight value according to the edge value, and may determine an image similarity between the consecutive frames by calculating a weighted arithmetic average by using the weight value and a histogram similarity.

According to an embodiment, in a comparison between two adjacent frames, each frame may be spatially divided into blocks, and a data set for deep learning may be constructed by analyzing a histogram similarity of each block and measuring a similarity of a frame by collecting a weighted average based on edge information.

Although training frame data is generated based on a similarity between a plurality of frames included in one video in the above embodiments, it is obvious to one of ordinary skill in the art that training frame data is generated based on a similarity between frames in a plurality of videos. For example, the disclosure may be applied to generate training frame data even when a first video and a second video are consecutive videos and a plurality of frames included in the first video and a plurality of frames included in the second video are used.

According to an embodiment, because data redundancy between consecutive frames in video data is reduced, imbalance between classes of training data may be resolved and overfitting that may occur due to repetition of similar frames for a specific object in a specific class may be minimized.

Although the embodiments have been described by the limited embodiments and the drawings as described above, various modifications and variations are possible by one of ordinary skill in the art from the above description. For example, appropriate results may be achieved even when the described techniques are performed in a different order from the described method, and/or the described elements such as a system, a structure, an apparatus, and a circuit are combined or integrated in a different manner from the described method or replaced or substituted by other elements or equivalents.

Hence, other implementations, other embodiments, and equivalents of the claims are within the scope of the following claims.

According to an embodiment, because data redundancy between consecutive frames in video data is reduced, imbalance between classes of training data may be resolved and overfitting that may occur due to repetition of similar frames for a specific object in a specific class may be minimized.

The effects of the disclosure not limited to the effects described above.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by one of ordinary skill in the art that various changes in form and details may be made therein without departing from the spirit and scope of the disclosure as defined by the following claims.

What is claimed is:

1. A method of generating a neural network model by using a video, the method comprising:

determining an image similarity between consecutive frames from among a plurality of frames included in the video;

generating training frame data by excluding at least one of the consecutive frames, when the image similarity is equal to or greater than a threshold value; and generating the neural network model based on the training frame data, wherein the determining of the image similarity comprises:

dividing each of the plurality of frames into a plurality of blocks;

calculating a histogram similarity between corresponding blocks between the consecutive frames from among the plurality of blocks; and determining the image similarity based on the histogram similarity.

2. The method of claim 1, wherein the generating of the training frame data comprises setting the threshold value in response to a user command.

3. The method of claim 1, wherein the calculating of the histogram similarity comprises calculating the histogram similarity by using at least one of a correlation, a chi squared test, an intersection, a Bhattacharyya distance, and an earth mover's distance (EMD) between the corresponding blocks between the consecutive frames.

4. The method of claim 1, wherein the determining of the image similarity based on the histogram similarity comprises:

detecting an edge value of each of the plurality of blocks;

determining a weight value according to the edge value; and determining the image similarity between the consecutive frames by calculating a weighted arithmetic average by using the weight value and the histogram similarity.

5. A computer device comprising:

a memory in which a video, a neural network model, and training frame data are stored; and a processor configured to determine an image similarity between consecutive frames from among a plurality of frames included in the video, generate the training frame data by excluding at least one of the consecutive frames when the image similarity is equal to or greater than a threshold value, and generate the neural network model based on the training frame data, wherein the processor is further configured to divide each of the plurality of frames into a plurality of blocks, calculate a histogram similarity between corresponding blocks between the consecutive frames from among the plurality of blocks, and determine the image similarity based on the histogram similarity.

6. The computer device of claim 5, wherein the processor is further configured to set the threshold value in response to a user command.

7. The computer device of claim 5, wherein the processor is further configured to calculate the histogram similarity by using at least one of a correlation, a chi squared test, an intersection, a Bhattacharyya distance, and an earth mover's distance (EMD) between the corresponding blocks between the consecutive frames.

8. The computer device of claim 5, wherein the processor is further configured to detect an edge value of each of the plurality of blocks, determine a weight value according to the edge value, and determine the image similarity between the consecutive frames by calculating a weighted arithmetic average by using the weight value and the histogram similarity.

* * * * *